United States Patent [19]
Hsien

[11] Patent Number: 5,734,376
[45] Date of Patent: Mar. 31, 1998

[54] JOYPAD CIRCUIT FOR PLAYING PC GAMES

[76] Inventor: Ming-kun Hsien, No. 53, Chungcheng Rd., Hsitzu Chen, Taipei Hsien, Taiwan

[21] Appl. No.: 578,075

[22] Filed: Dec. 27, 1995

[51] Int. Cl.⁶ .................................................. G09G 5/00
[52] U.S. Cl. .......................... 345/168; 345/184; 463/37; 463/29
[58] Field of Search ......................... 345/156, 172, 345/204, 902, 168, 184; 463/29, 37

[56] References Cited

U.S. PATENT DOCUMENTS

| | | | |
|---|---|---|---|
| 4,430,649 | 2/1984 | Leininger | 345/143 |
| 4,641,262 | 2/1987 | Bryan et al. | 345/168 |
| 5,184,830 | 2/1993 | Okada et al. | 463/37 |
| 5,317,505 | 5/1994 | Karabed et al. | 345/156 |
| 5,531,443 | 7/1996 | Cruz | 463/37 |
| 5,557,299 | 9/1996 | Maynard et al. | 345/168 |
| 5,645,277 | 7/1997 | Cheng | 463/37 |

Primary Examiner—Richard Hjerpe
Assistant Examiner—Vui T. Tran
Attorney, Agent, or Firm—Oppenheimer Poms Smith

[57] ABSTRACT

A joypad circuit for playing PC games includes a switching circuit connected between a PC and a keyboard, a microprocessor connected to the switching circuit for blocking signals from the keyboard and controlling the operation of the PC, a memory connected to the microprocessor for storing data from the keyboard during a setting mode, a plurality of switches for a user to select a desired function, a button processing circuit connected to the microprocessor for selecting a plurality of data stored in the memory in response to the user's selection to the switches, a special control circuit for performing special control of the PC when the number of the switches is not enough to control the PC, and a mode selecting circuit connecting with the microprocessor for selecting a desired operation mode.

5 Claims, 3 Drawing Sheets

JOYPAD CIRCUIT FOR PLAYING PC GAMES

BACKGROUND OF THE INVENTION

The present invention relates to a joypad for playing a video game, and particularly to a circuit arrangement for playing personal computer games.

In recent years, video games have become a particular favorite entertainment to teenagers and adults. Thus, many apparatuses for playing video games are developed. One of the apparatuses is a personal computer (PC) which receives video game programs stored in storage devices such as floppy disks or CD-ROMs and applies a keyboard to play a video game within the PC. As the keyboard has a great number of keys thereon, it has a considerable size and weight. Accordingly, it is clumsy for a player to use. Apparently, the entertainment effect from a keyboard for playing PC games is much less than a joypad for playing video games.

SUMMARY OF THE INVENTION

An objective of the present invention is to provide a joypad circuit for playing PC games.

According to the present invention, a joypad circuit for playing PC games includes a switching circuit connected between a PC and a keyboard, a microprocessor connected to the switching circuit for blocking signals from the keyboard and controlling the operation of the PC, a memory connected to the controller for storing data from the keyboard during a setting mode, a plurality of switches for a user to select a desired function, a button processing circuit connected to the microprocessor for selecting a plurality of data stored in the memory in response to the user's selection to the switches, a special control circuit for performing special control to the PC when the number of the switches is not enough to control the PC, and a mode selecting circuit connecting with the microprocessor for selecting a desired operation mode.

Other objects, advantages, and novel features of the invention will become more apparent from the following detailed description when taken in conjunction with the accompanying drawings.

DETAILED DESCRIPTION OF THE PREFERRED EMBODIMENTS

Figure 1:
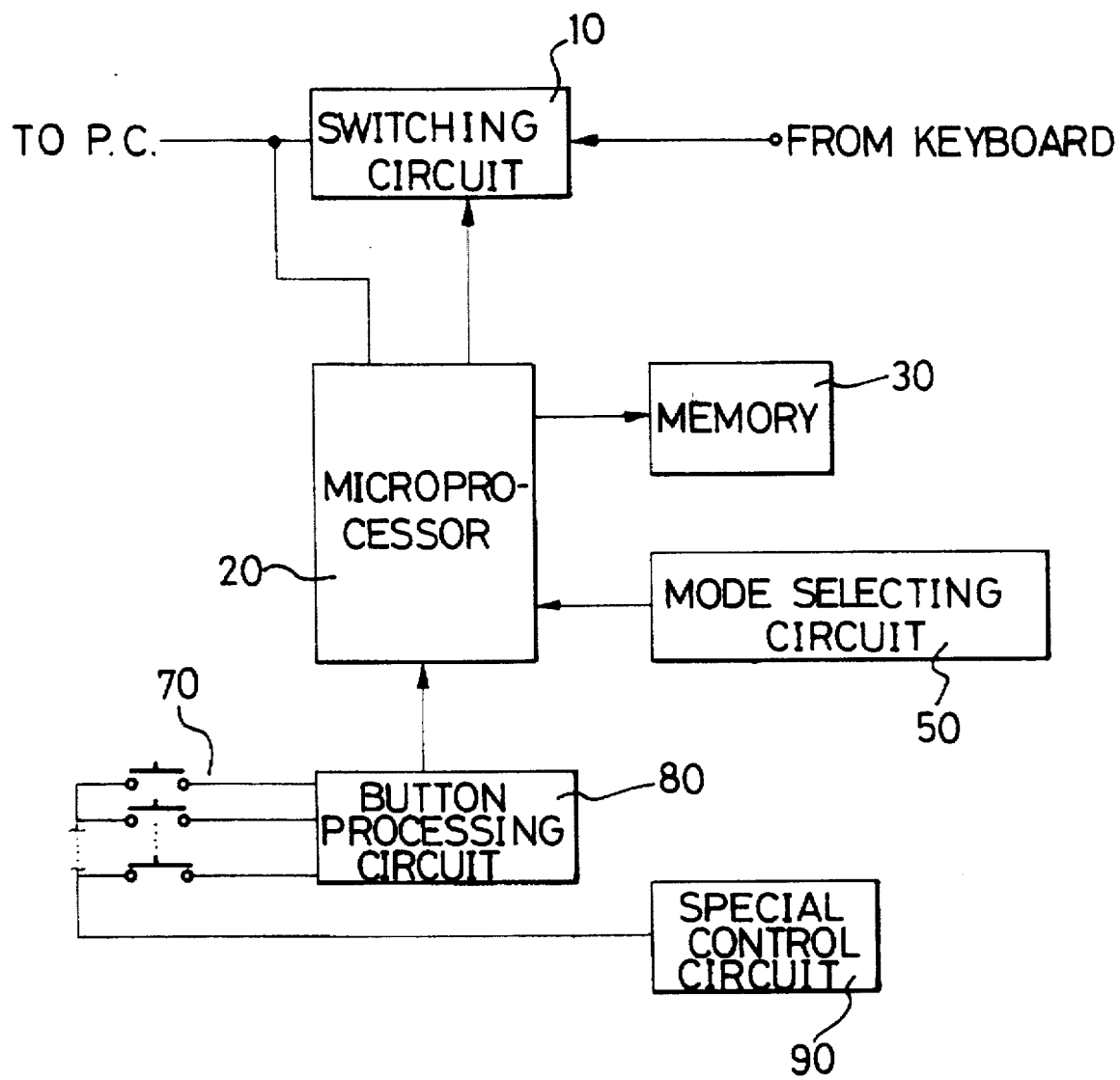
FIG. 1 is a block diagram of the joypad circuit of the present invention.

Referring to FIG. 1, the joypad circuit for playing PC games in accordance with the present invention includes a switching circuit 10 connected between a personal computer (PC) (not shown) and a keyboard (not shown), a microprocessor 20 connected to the switching circuit 10 for blocking signals from the keyboard and controlling the operation of the PC instead of the keyboard, a memory 30 connected to the microprocessor 20 for storing data from the microprocessor 20 during a setting mode, a mode selecting circuit 50 connecting with the microprocessor for selecting a desired operation mode, a plurality of switches 70 for a user to select a desired function, a button processing circuit 80 connected to the microprocessor 20 for selecting a plurality of data stored in the memory in response to the user's selection to the switches 70, and a special control circuit 90 for performing special control to the PC when the number of the switches 70 is not enough to control the PC.

Figure 2:
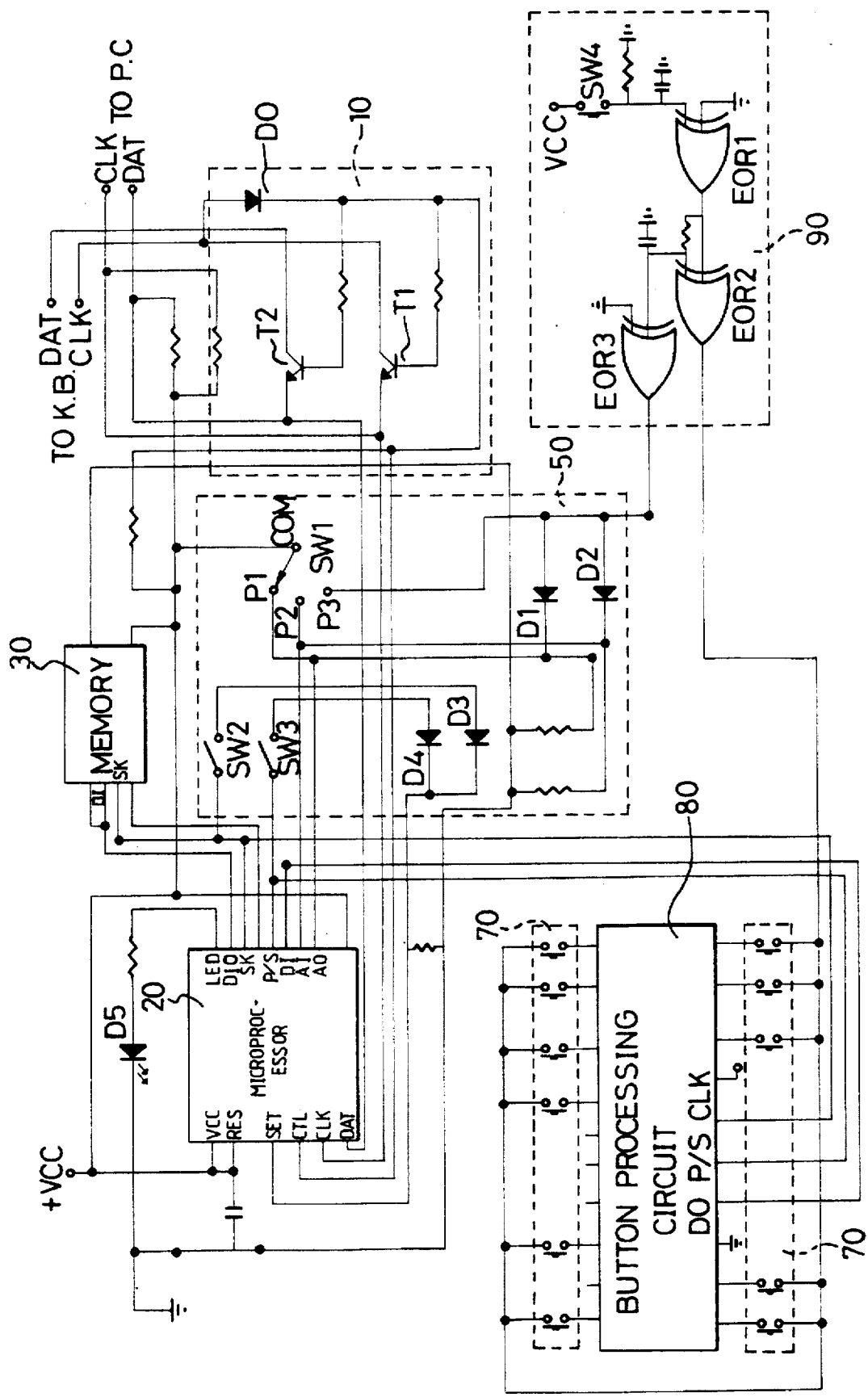
FIG. 2 is a detailed circuit diagram of the joypad circuit of the present invention.

As shown in FIG. 2, a detailed circuit diagram of the joypad circuit of the present invention includes a switching circuit 10 composed of a transistor T1 having a collector connected to a clock (CLK) line of a keyboard (not shown) and an emitter respectively connected to a clock (CLK) line of a PC, a transistor T2 having a collector connected to a data (DAT) line of a keyboard and an emitter connected to a data (DAT) line connected to the PC, a microprocessor 20 having a clock (CLK) pin connected to the emitter of the transistor T1, a data (DAT) pin connected to the emitter of the transistor T2, and a control (CTL) pin connected to the bases of the transistors T1, T2. The bases of the transistors T1, T2 are also connected to the clock (CLK) line of the keyboard via a diode D0. When the CTL pin of the microprocessor 20 is in a high level, the transistors T1, T2 will be turned on, the signals from the DAT line and CLK line of the keyboard will be transmitted to the microprocessor 20 and the PC, while in case of that the CTL pin of the microprocessor 20 is in a low level, the transistors T1, T2 will be turned off, thus, the signals from the keyboard will be interrupted from transmitting to the PC and the PC will directly receive the signals from the CLK and DAT pins of the microprocessor 20.

The microprocessor 20 also has a control clock (SK) pin, a data input/output (DIO) pin, and two address pins A0, A1. The joypad circuit of the present invention also includes a memory 30 having a control clock (SK) pin and a data input (DI) pin respectively connected with the SK pin and the DIO pin of the microprocessor 20 for storing or accessing data in the memory 30 when the SK pin of the microprocessor 20 transmits a corresponding signal. Further, when electric power is turned off, the memory 30 retains the preset data for next-time use.

The joypad circuit of this invention also includes a mode selecting circuit 50 composed of a three-position selector switch SW1, a direction switch SW2 for determining whether the joypad is operating in four direction or in eight direction, and a setting switch SW3. The selector switch Sw1 has a common (COM) point connected with the DAT line of a PC and a voltage source Vcc, a contact P1 connected to the address A0 pin of the microprocessor 20, a contact P2 connected to the address A1 pin of the microprocessor 20, and a contact P3 connected to the contacts P1, P2 via a diode D1 and a diode D2. When the switch SW1 selects contact P1, the address pins A0, A1 will be "00" referred as "mode 1",when the switch SW1 selects contact P2, the address pins A0, A1 will be "01" referred as "mode 2",and when the switch SW1 selects contact P3, the address pins A0, A1 will be "10" referred as "mode 3" thereby providing three different types of playing modes.

The microprocessor 20 also has an enable (P/S) pin, a data input (DI) pin, and a set (SET) pin. The switches SW2, SW3 each have a first end respectively connected to the SK pin and the P/S pin of the microprocessor 20 and a second end connected to the SET pin of the microprocessor 20 via a respective diode D3, D4. When the setting switch SW3 is switched on, a high level signal will be sent to the SET pin of the microprocessor 20 for executing setting operation in cooperation with the selector switch SW1, a plurality of switches 70 (discussed later) and a keyboard (not shown).

The procedure of setting operation is: setting the switch SW1 in mode 1, and sequentially operating each of the function keys of the keyboard in cooperation with the button 70, then setting the switch SW1 in mode 2, and sequentially operating each of the function keys of the keyboard in cooperation with the button 70, and setting the switch SW1 in mode 3, and sequentially operating each of the function keys of the keyboard in cooperation with button 70. Then, the joypad shown in FIG. 3 will completely replace the keyboard and the user may directly utilize the joypad to play the PC games.

Figure 3:
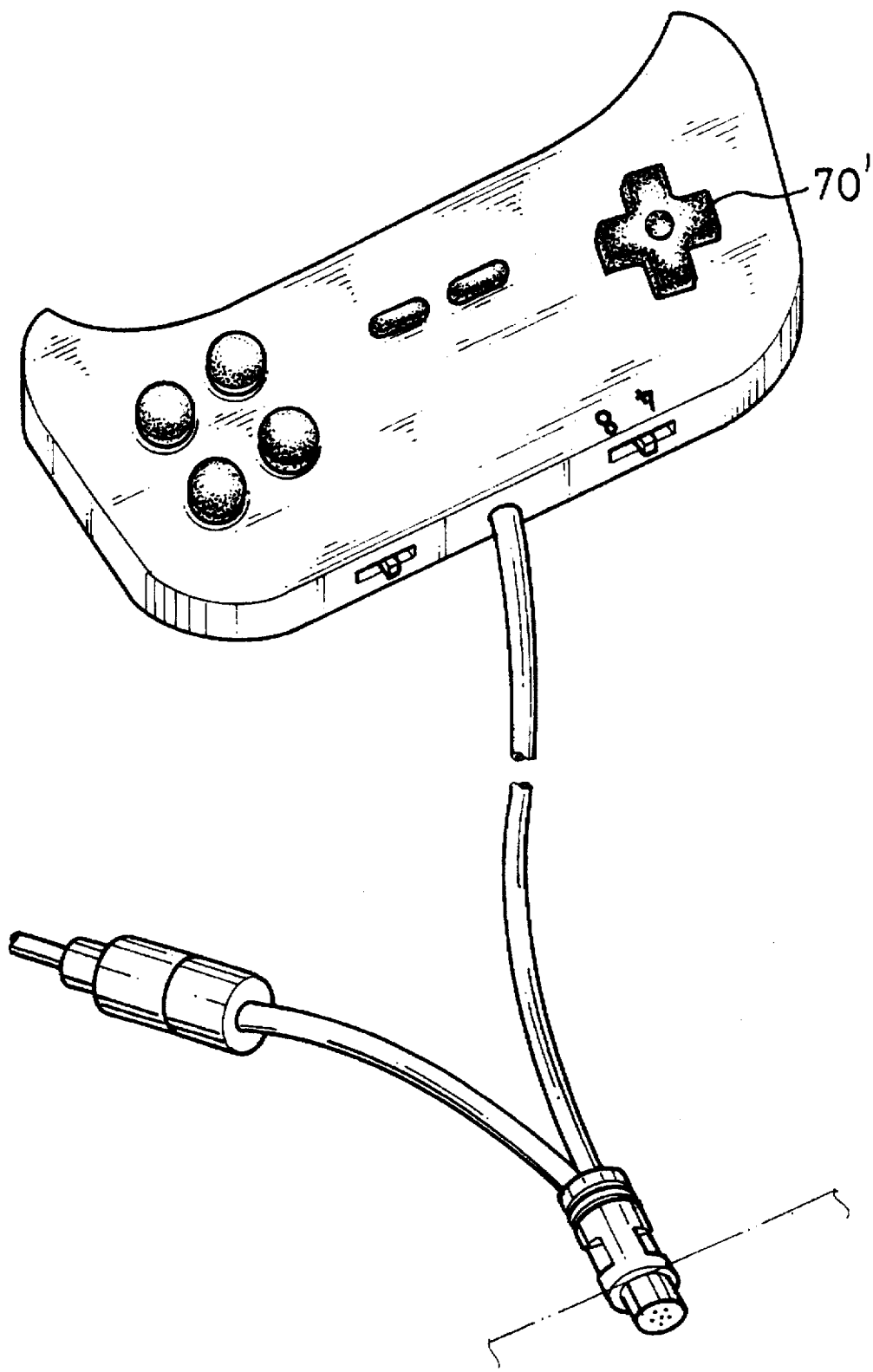
FIG. 3 is a perspective view of a joypad in accordance with the present invention.

As shown, when the switch SW2 is turned off, the operation of a directional switch 70' shown in FIG. 3 is defaulted to a four-direction operation, if the switch SW2 is turned on, the operation thereof will be an eight-direction operation. The microprocessor 20 has an LED pin in cooperation with an LED D5 for indicating the operating status of the joypad.

The joypad circuit of the present invention further includes a plurality of switches 70 corresponding to the buttons shown in FIG. 3 and a button processing circuit 80 having a clock (CLK) pin, an enable (P/S) pin, and a data output (DO) pin respectively connected to the SK pin, the P/S pin, and the DI pin of the microprocessor 20. When the SK pin of the microprocessor 20 transmits a signal to the CLK pin of the button processing circuit 80, the microprocessor 20 will receive the data shown by the switches 70. When the P/S pin of the microprocessor 20 outputs a high level signal to the P/S pin of the button processing circuit 80, the data received from the button processing circuit 80 will be converted into serial data and input to the DI pin of the microprocessor 20. The microprocessor 20 will transmit a signal to memory 30 for accessing a corresponding data in the memory 30 and receive a corresponding data from the DIO pin, then transmit a corresponding signal to the PC.

The joypad circuit of the present invention further includes a special control circuit 90 composed of a special switch SW4, a first exclusive OR gate EOR1 having an input terminal connected to a voltage source Vcc via the special switch SW4 and an output terminal, a second exclusive OR gate EOR2 having an input terminal connected to the output terminal of the first exclusive OR gate and an output terminal connected to a common point of the switches 70, and a third exclusive OR gate EOR3 having an input terminal connected to the output terminal of the first exclusive OR gate EOR1 and an output terminal connected to the contact P3 of the switch SW1 so as to define an "11" for the address pins A0, A1 of the microprocessor 20 when the switch SW3 and the special switch SW4 are simultaneously turned on while the output terminal of the second exclusive OR gate EOR2 will output a high level signal to enable the switches 70 for performing a setting mode for special games. If the number of the switches 70 is not sufficient for playing a PC game, the special switch SW4 may perform a function of extending the selection of a switch similar to the function of "Shift" key in computer keyboard.

Although the invention has been explained in relation to its preferred embodiment, it is to be understood that many other possible modifications and variations can be made without departing from the spirit and scope of the invention as hereinafter claimed.

I claim:
1. A joypad circuit for playing PC games comprising:

a switching circuit connected between a PC and a keyboard;

a microprocessor connected to the switching circuit for blocking signals from the keyboard and controlling the operation of the PC;

a memory connected to the microprocessor for storing data from the keyboard during a setting mode;

a plurality of switches for a user to select a desired function;

a button processing circuit connected to the microprocessor for selecting a plurality of data stored in the memory in response to the user's selection to the switches;

a special control circuit for performing special control to the PC when the number of the switches is not enough to control the PC; and a mode selecting circuit connecting with the microprocessor for selecting a desired operation mode.

2. A joypad circuit as claimed in claim 1, wherein said switching circuit includes a first transistor and a second transistor each having a collector and an emitter respectively connected to a corresponding data pin and clock pin of the microprocessor and a base connected to a control pin of the microprocessor.

3. A joypad circuit as claimed in claim 1, wherein said mode selecting circuit includes a three-position selector switch having a first contact connected to a first address pin, a second contact connected to a second address pin as to alter the address signal of the microprocessor, and a third contact, a direction switch for determining whether the joypad is operating in four directions or in eight directions, and a setting switch SW3.

4. A joypad circuit as claimed in claim 1, wherein said button processing circuit having a clock pin, an enable pin, and a data input pin respectively coupled with a control clock pin, an enable pin, and a data input pin of the microprocessor.

5. A joypad circuit as claimed in claim 3, wherein said special control circuit having a first exclusive OR gate having an input terminal and an output terminal, a second exclusive OR gate having an input terminal connected to the output terminal of the first exclusive OR gate and an output terminal connected to a common contact of the switches, a third exclusive OR gate having an input terminal connected to the output terminal of the first exclusive OR gate and an output terminal connected to the third contact of the selector switch, and a special control switch connected to an input of the first exclusive OR gate.

* * * * *